US008190691B2

(12) United States Patent
Jang et al.

(10) Patent No.: US 8,190,691 B2
(45) Date of Patent: May 29, 2012

(54) TERMINAL AND METHOD FOR DISTINGUISHING BETWEEN EMAIL RECIPIENTS USING SPECIFIC IDENTIFIER

(75) Inventors: Ki-Tae Jang, Seongnam-si (KR); Jung-Woo Kim, Seongnam-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 435 days.

(21) Appl. No.: 11/900,979

(22) Filed: Sep. 14, 2007

(65) Prior Publication Data
US 2008/0263161 A1 Oct. 23, 2008

(30) Foreign Application Priority Data

Apr. 23, 2007 (KR) .................. 10-2007-0039368

(51) Int. Cl.
G06F 15/16 (2006.01)
(52) U.S. Cl. ......... 709/206; 709/239; 709/207; 709/204
(58) Field of Classification Search .................. 709/206, 709/239, 207, 204; 345/752
See application file for complete search history.

(56) References Cited

U.S. PATENT DOCUMENTS

| 6,192,396 | B1 * | 2/2001 | Kohler | 709/206 |
| 6,628,306 | B1 * | 9/2003 | Marchionda | 715/752 |
| 7,613,732 | B2 * | 11/2009 | Oh | 1/1 |
| 2002/0073159 | A1 * | 6/2002 | Jain | 709/206 |
| 2002/0194341 | A1 * | 12/2002 | Gupta | 709/227 |
| 2003/0225837 | A1 * | 12/2003 | Delia et al. | 709/206 |
| 2006/0026244 | A1 * | 2/2006 | Watson | 709/206 |
| 2006/0277260 | A1 * | 12/2006 | Hardy | 709/206 |
| 2006/0277263 | A1 * | 12/2006 | Daniels et al. | 709/206 |
| 2007/0016644 | A1 * | 1/2007 | Corona | 709/206 |
| 2007/0061400 | A1 * | 3/2007 | Parsons | 709/206 |
| 2007/0106736 | A1 * | 5/2007 | Shepherd | 709/206 |

FOREIGN PATENT DOCUMENTS

| KR | 2001-0062352 | 7/2001 |
| KR | 2002/66973 | 8/2002 |
| KR | 2007-0010237 | 1/2007 |

* cited by examiner

*Primary Examiner* — Krista Zele
*Assistant Examiner* — James Forman
(74) *Attorney, Agent, or Firm* — Cha & Reiter, LLC

(57) ABSTRACT

Provided are a terminal and method for distinguishing between email recipients using a specific identifier. According to the inventive terminal and method, when email is desired to be sent to several recipients, it is possible to set an individual transmission configuration for each recipient and transmit the email in different formats depending on the recipients. Thus, a large-sized file is prevented from being unnecessarily created or transferred, thereby reducing unnecessary traffic. In addition, it is possible to prevent the storage space of a mobile device from being wasted due to receiving an unwanted attachment file.

18 Claims, 5 Drawing Sheets

FIG. 2
(PRIOR ART)

```
C : RCPT TO : Samsung1@samsung.com              ······>S210
S : 250 Samsung1@samsung.com... Recipient ok    ······>S220
C : RCPT TO : Samsung2@samsung.com              ······>S230
S : 250 Samsung2@samsung.com... Recipient ok    ······>S240
....
C : DATA                                        ······>S250
Return-Path: <MAILER-DAEMON@mailhost.abcde.com>
Received: from localhost (mail@localhost [127.0.0.1]
          by abcde.fghij.com with ESMTP ....
Date: Sat, 12 Nov 1990 12:15:30 +1000
From: Mail Delivery System <MAILER-DAEMON@mailhost.abcde.com>
Message-Id: <128371232.ASD123A@XXXX>
To: <Samsung1@samsung.com>
....
```

FIG. 3

C: EHLO Babo
S: 250-com-mailhost.abcde.com Hello
S: 250-EXPN
S: 250-VERB
S: 250-8BITMIME
S: 250-SIZE
S: 250-DSN
S: 250-ETRN C: MAIL FROM: Samsung12345@Samsung.com
S: 250 Samsung12345@samsung.com... Sender ok C: RCPT TO: CellphoneUser1@mail.com ······ (A)
S: 250 CellphoneUser1@mail.com... Recipient ok C: RCPT TO: mayday@abc.com ATTACHMENT=NO ······ (B)
S: 250 CellphoneUser1@mail.com... Recipient ok

······

TERMINAL AND METHOD FOR DISTINGUISHING BETWEEN EMAIL RECIPIENTS USING SPECIFIC IDENTIFIER

CLAIM OF PRIORITY

This application claims the benefit under 35 U.S.C. §119(a) from an application entitled "TERMINAL AND METHOD FOR DISTINGUISHING BETWEEN EMAIL RECIPIENTS USING SPECIFIC IDENTIFIER," filed in the Korean Intellectual Property Office on Apr. 23, 2007 and assigned Serial No. 2007-0039368, the entire contents of which are hereby incorporated herein by reference.

BACKGROUND OF THE INVENTION

The present invention relates to a terminal for distinguishing between email recipients using a specific identifier and its method.

A standard communication protocol used to send email via the Internet is referred to as Simple Mail Transfer Protocol (SMTP).

In general, there are 3 steps in an SMTP mail transaction. The email transaction begins with a MAIL command providing identification to a sender, then at least one successive recipient (RCPT) command providing information to a recipient follows the MAIL command. Finally, an end indicator of mail data confirms the email transaction.

The respective above steps will be described in further detail below.

The first step in the procedure is the MAIL command. Once a transmission channel is established, SMTP transmits the MAIL command indicating an email sender. The MAIL command initiates a new mail transaction, and instructs an SMTP-receiver to reset all state tables and then buffers including any recipient or mail data. In addition, the MAIL command provides a reverse path that can be used to report errors. When the MAIL command is accepted, the SMTP-receiver returns a OK reply.

The second step in the procedure is an RCPT command. The RCPT command provides one forward-path that identifies one recipient. When the RCPT command is accepted, a receiver-SMTP returns an OK reply and stores the forward-path. When the recipient is not identified, the receiver-SMTP returns a failure reply. This second step may be repeated any number of times. The forward-path can contain at least one mailbox.

The forward-path consists of a list of hosts, which is optional, and a destination mailbox, which is required. The list of hosts indicates that it is a source route, and the email must be relayed to the next host in the list. When the receiver-SMTP does not implement the relay function, it may use the same reply as that for an unknown local user. When the email is relayed, a relay host must be removed from the start of the forward-path and located at the start of the reverse-path. When the email arrives at the final destination, the destination mailbox alone is contained in the forward-path, and the receiver inserts the email in the destination mailbox on the basis of host mail conventions.

The final step in the procedure is a DATA command. When the DATA command is accepted, the SMTP-receiver returns a intermediate reply and considers all succeeding lines as a message text. When the end of the text is received and stored, the SMTP-receiver transmits an OK reply. Since mail data is sent on a transmission channel, the end of mail data must be indicated so that the command and reply dialog can be resumed.

SMTP indicates the end of mail data by transmitting a line containing only a period. An end indicator of mail data also confirms the mail transaction and instructs the receiver-SMTP to process to store recipients and mail data. When the command is accepted, the receiver-SMTP returns a OK reply. When the mail transaction is incomplete (e.g., when there is no recipient) or when resources are not available, it is considered that the DATA command has failed.

When the receiver-SMTP accepts the message for either relay or final delivery, it inserts a time-stamp line at the beginning of the mail data. The time-stamp line indicates the identity of the host that sent the message, the identity of the host that received the message and inserted the time stamp, and the date and time that the message was received. The relayed messages have multiple time-stamp line. When the receiver-SMTP makes final delivery of the message, it inserts a return-path line at the beginning of the mail data. In general, final delivery means that a message is delivered to a destination user, but in some cases the message may be further processed and transmitted by another mail system. The return-path line preserves information in the reverse path from the MAIL command.

FIG. 1 illustrates a general process of transmitting an email. As shown, a sender Mail User Agent (MUA) 110 contacts a forward Mail Transfer Agent (MTA) 120 using SMTP (S101). Then, the forward MTA 120 connects a system call to a Transmission Control Protocol (TCP) Mail Delivery Agent (MDA) 130 (S102).

The TCP MDA 130 sends a contact content between the sender MUA 110 and the forward MTA 120 to a receiver MTA 140 using SMTP (S103). Then, the receiver MTA 140 connects the system call to a local MDA 150 (S104). When the call is established, the local MDA 150 creates and sends a mail to a mailbox 160 (S105). The mailbox receiving the mail connects the system call to a receiver MUA 170 (S106). Then, a user reads the mail using a Mail Retrieval Agent (MRA).

FIG. 2 illustrates a conventional header created when an email is transmitted using SMTP. As shown, when a user inputs mail recipients, a server creates a mail header on the basis of the input information. Here, SMTP uses an RCPT command to identify the respective email recipients. When there are several email recipients, SMTP specifies the recipients using the RCPT command several times.

It is assumed in FIG. 2 that a user wants to send email to recipients A and B at the same time. Here, A's email address is Samsung1@samsung.com, and B's email address is Samsung2@samsung.com.

When the user inputs the recipients of the email as A and B, SMTP creates a header having A and B as recipients. First of all, an RCPT command, specifying that A is a recipient, is generated and sent to A (S210). When receiving the RCPT command, A determines whether the email can be accepted. When the email can be accepted, A accepts the RCPT command and returns an OK reply in response to the command (S220). On the contrary, when the email cannot be accepted, A returns a rejection response.

Then, the RCPT command is sent to B, who is the other email recipient (S230), and a response to the RCPT command is received (S240). Here, steps 230 and 240 are performed in the same way as steps 210 and 220.

When receiving the responses from the recipients A and B, SMPT forwards a DATA command, thereby transmitting the email.

In mobile devices, traffic is an important concern because of the following reasons.

First, traffic is associated with billing. Unlike a network of desktops operating under a flat sum system, a mobile device is charged for network access time. Therefore, all packets exchanged for data transmission may be a burden on a user.

Second, traffic is associated with speed. Speed also can be an important concern in a wireless environment providing a lower speed than a wired environment.

Meanwhile, storage space also can be an important concern in mobile devices. Fundamentally, the storage space of a mobile device is much smaller than that of a desktop. Therefore, when unnecessary traffic is caused and occupies much of the storage space of the mobile device, a user may not store necessary files or delete stored files.

When a user of a mobile device wants to send the same mail to several users, he/she inputs users who will receive the mail in the recipient field of the mail. In this case, the mail is sent to all the users in the same format. In other words, the same text and attachment file are sent to all the recipients.

Therefore, a mail having no, attachment file must be newly created for a recipient to whom the text with no attachment file is needed to be sent, which may cause unnecessary traffic in the mobile device. Furthermore, in this case, the user may waste the storage space of the mobile device due to the newly created mail.

Currently, email is coming into the spotlight as the most promising communication means in mobile devices. However, in comparison with a desktop, a mobile device has drawbacks in traffic, storage space, etc., and thus an email environment must be optimized for a mobile environment.

SUMMARY OF THE INVENTION

The present invention provides a method of distinguishing between email recipients using a specific identifier thus improving g a method of inputting a recipient according to Simple Mail Transfer Protocol (SMTP), such that each recipient have an individual transmission configuration in order to make a more efficient environment by solving the prior art problems of traffic and storage space.

A first aspect of the present invention provides a method of distinguishing between email recipients using a specific identifier, comprising: setting an individual email transmission configuration of each recipient using the specific identifier; adding a parameter indicating the set transmission configuration to a recipient (RCPT) command and transmitting the RCPT command to a recipient for whom the specific identifier is set, and transmitting an RCPT command without the parameter to a recipient for whom the specific identifier is not set; and when a response to the RCPT command is received, transmitting email according to the transmission configuration set for each recipient.

In the embodiment, the individual email transmission configuration may indicate transmission of a mail text content alone without an attachment file.

In the embodiment, a value of the parameter may be set to "NO" for a recipient receiving the mail text content alone without an attachment file.

In the embodiment, when transmitting an email according to the transmission configuration set for each recipient, the mail text content alone without an attachment file may be sent to the recipient of the RCPT command including the parameter value set to "NO", and an attachment file as well as the mail text content may be sent to the recipient of the RCPT command not including the parameter.

A second aspect of the present invention provides a terminal for distinguishing between email recipients using a specific identifier, comprising: an identification recognizer for recognizing the specific identifier, checking an individual email transmission configuration set for each recipient, and sending information on the transmission configuration to a parameter generator; the parameter generator for adding a parameter indicating the set transmission configuration to an RCPT command to be sent to a recipient for whom the specific identifier is set; and a central processor for transmitting an email according to the transmission configuration set for each recipient when a response to the RCPT command is received.

In the embodiment, the individual email transmission configuration may indicate transmission of a mail text content alone without an attachment file.

In the embodiment, the parameter generator may add the parameter indicating the individual transmission configuration to the RCPT command sent to the recipient receiving the mail text content alone without an attachment file, and set a value of the parameter to "NO."

In the embodiment, the central processor may send the mail text content alone without an attachment file to the recipient of the RCPT command including the parameter value set to "NO", and send an attachment file as well as the mail text content to a recipient of the RCPT command not including the parameter.

The terminal for distinguishing an email recipient using a specific identifier may further comprise a header creator for creating an email header with reference to information on the RCPT command received from the parameter generator, and transmitting the created email header to the central processor.

BRIEF DESCRIPTION OF THE DRAWINGS

A more complete appreciation of the invention, and many of the attendant advantages thereof, will be readily apparent as the same becomes better understood by reference to the following detailed description, when considered in conjunction with the accompanying drawings, in which like reference symbols indicate the same or similar components, wherein:

FIG. 2 illustrates a conventional header created when an email is transmitted using Simple Mail Transfer Protocol (SMTP);

FIG. 3 illustrates a process of sending a recipient (RCPT) command to let each recipient have an individual email transmission configuration according to the present invention;

DETAILED DESCRIPTION OF THE INVENTION

Figure 1:
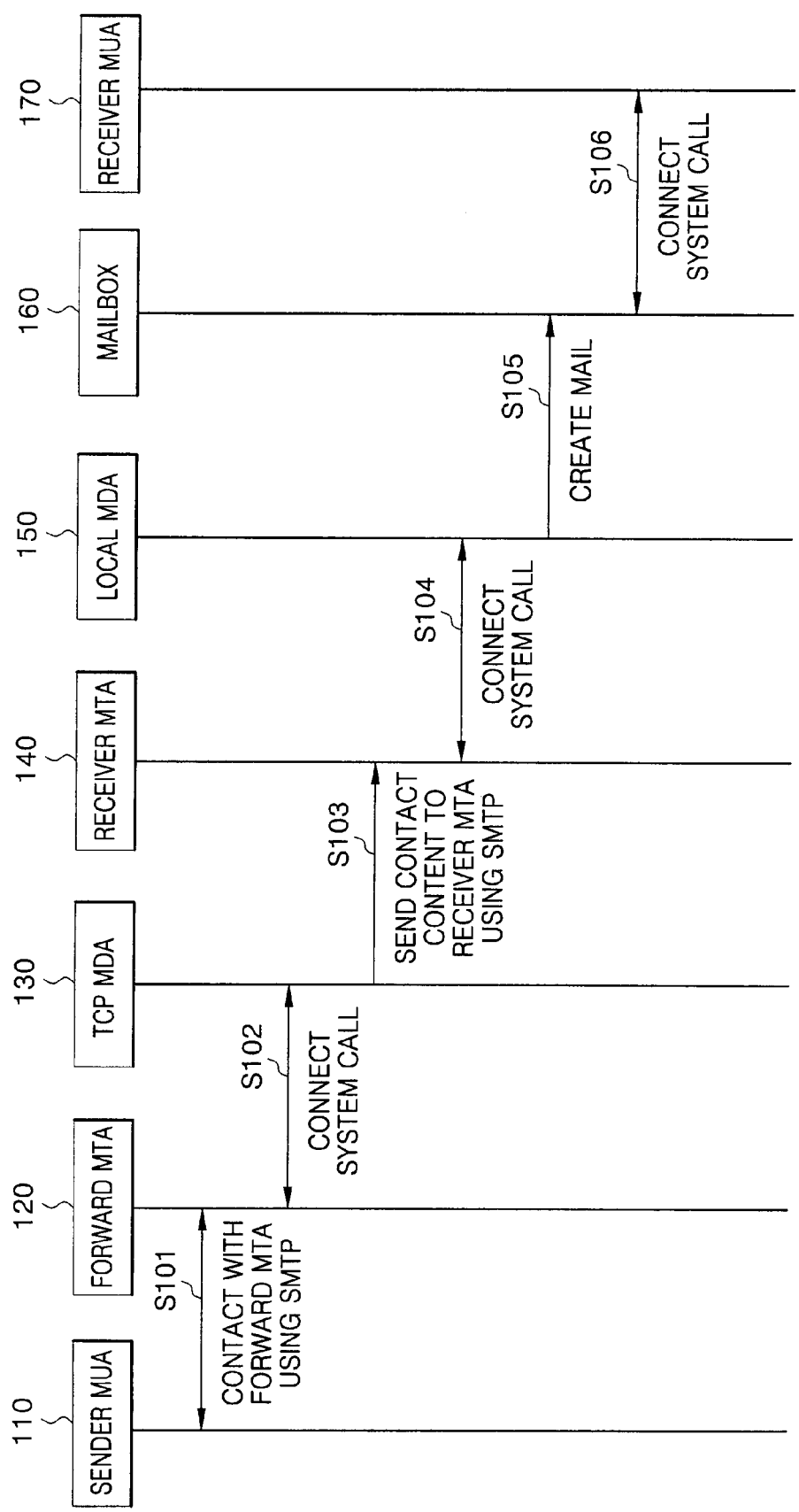
FIG. 1 illustrates a general process of transmitting an email.

Hereinafter, exemplary embodiments of the present invention will be described in detail with reference to the accompanying drawings. For the purposes of clarity and simplicity, a detailed description of known functions and configurations incorporated herein has been omitted for conciseness.

In order to implement a method of distinguishing between email recipients according to the present invention, a user must classify and input a recipient having a specific email transmission configuration, and a network must classify input recipients and create headers. For convenience, the step of classifying and inputting, by a user, a recipient having a specific email transmission configuration will be referred to as a client level, and the step of classifying, at a network, an input recipient and creating a header will be referred to as a server (protocol) level. The present invention operates at both the server (protocol) level and the client level.

First, the client level will be described below.

When inputting recipients at the client level, a user generally uses a separator such as a semicolon. In this case, a semicolon is a recipient separator for separating recipients. For example, when a user wants to send a mail to Gil-dong Hong, Woo-chi Jeon, Dol-seok Kim, and Ba-woo Lee, a recipient field is expressed as follows.

Gil-dong Hong; Woo-chi Jeon; Dol-seok Kim; Ba-woo Lee;

When a user wants to remove an attachment file and send only a mail text content to a specific recipient, an identifier indicating this must be defined. The identifier defined in the present invention is referred to as a specific email transmission configuration identifier. The specific email transmission configuration identifier indicates a recipient to whom a mail text content alone without an attachment file is sent. The specific email transmission configuration identifier is added behind the recipient separator.

For example, the specific email transmission configuration identifier is defined as a comma. Thus, when the user wants to remove an attachment file and send only a mail text content to Gil-dong Hong and Dol-seok Kim, he/she further inputs the specific email transmission configuration identifier behind the recipient separator of the email recipient field. In this case, the recipient field of the email is expressed as follows.

Gil-dong Hong; Woo-chi Jeon; Dol-seok Kim; Ba-woo Lee;

At the server (protocol) level, email headers are created to correspond to the configuration of the recipients implemented by the user in the client level. To this end, an ATTACHMENT parameter is defined in the server (protocol) level.

The ATTACHMENT parameter indicates a recipient to whom a mail text content alone without an attachment file will be transmitted. At the server level, the ATTACHMENT parameter is added upon generation of an RCPT command that specifies a recipient. When the mail text content alone without an attachment file is desired to be sent to a user having an email address "Samsung1@samsung.com", the following RCPT command is generated in the server level.

C: RCPT TO: Samsung1@samsung.com ATTACHMENT=NO

S: 250 Samsung1@samsung.com . . . Recipient ok

To a recipient of an RCPT command in which the value of the ATTACHMENT parameter is set to "NO," the mail text content alone without an attachment file is sent.

Meanwhile, when there is an attachment file upon transmission of a mail, the ATTACHMENT parameter is not added behind a recipient upon generation of an RCPT command.

FIG. 3 illustrates a process of sending RCPT commands to allow each recipient have an individual email transmission configuration according to the present invention.

Referring to FIG. 3, in the RCPT command sent to the user of an email address "CellphoneUser1@mail.com" shown in line (A), there is no ATTACHMENT parameter. Therefore, a mail including an attachment file as well as a text content is sent to the user of the email address.

On the other hand, in the RCPT command sent to the user of an email address "mayday@abc.com" shown in line (B), the value of the ATTACHMENT parameter is set to "NO." Therefore, the mail content alone without an attachment file is sent to the recipient of the RCPT command shown in line (B).

Figure 4:
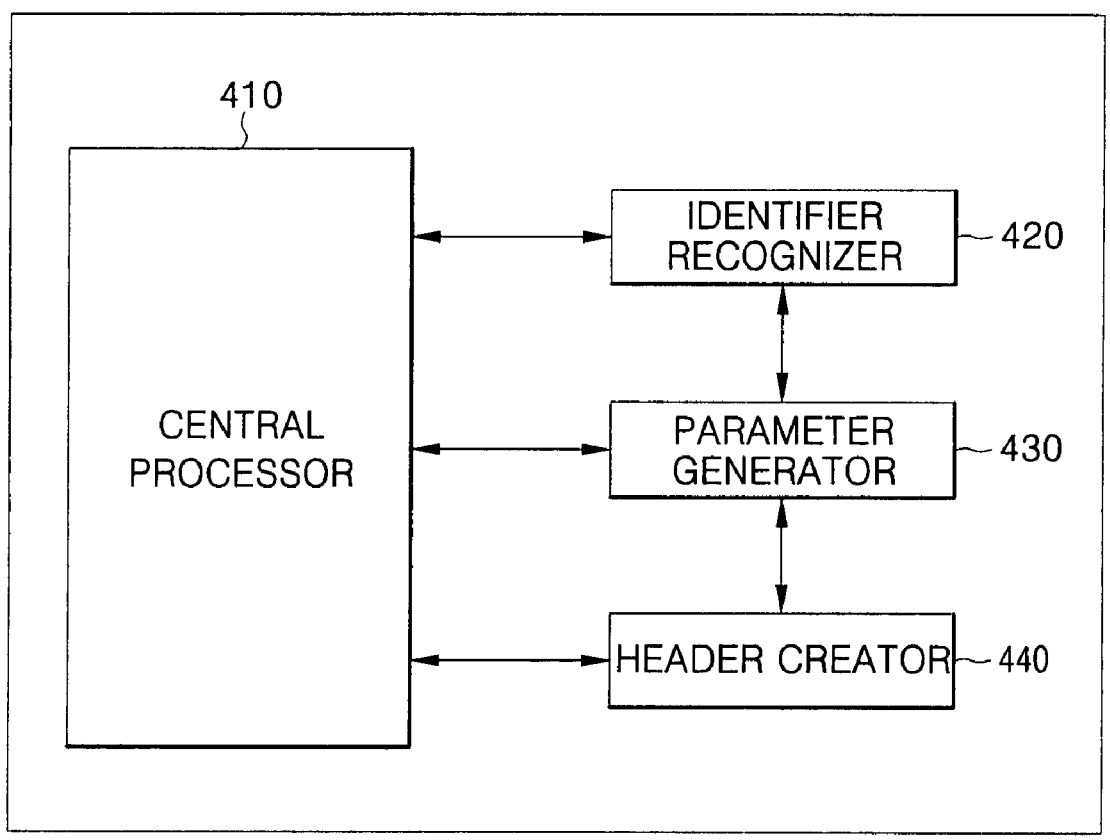
FIG. 4 is a block diagram of a terminal for distinguishing between email recipients using a specific identifier according to an exemplary embodiment of the present invention.

FIG. 4 is a block diagram of a terminal for distinguishing between email recipients using a specific identifier according to an exemplary embodiment of the present invention.

Referring to FIG. 4, the terminal comprises a central processor 410, an identifier recognizer 420, a parameter generator 430 and a header creator 440.

The central processor 410 generates a command for transmission and reception of an email (e.g., a MAIL command, and a DATA command) and transmits the command to a receiving-side user, and receives a response to the command. In addition, the central processor 410 establishes a transmission channel between a sender and a receiver, and sends email to the recipient through the established channel. Here, with reference to a header received from the header creator 440, the central processor 410 includes or removes an attachment file in/from the mail, and transmits the mail.

The identifier recognizer 420 recognizes a specific email transmission configuration identifier input in the client level, and classifies a user into either a user to whom a mail text content alone without an attachment file will be sent, or a user to whom a mail including an attachment file will be sent. Here, the identifier recognizer 420 transfers information on a transmission configuration set for each recipient about whether to include an attachment file, to the parameter generator 430.

With reference to the information received from the identifier recognizer 420, the parameter generator 430 adds an ATTACHMENT parameter to an RCPT command sent to a user who will receive the mail text content alone without an attachment file. In addition, the parameter generator 430 transfers information on an RCPT command including the ATTACHMENT parameter to the header creator 440.

With reference to the information on the RCPT command received from the parameter generator 430, the header creator 440 creates an email header. Here, the header creator 440 transfers the created email header to the central processor 410.

Figure 5:
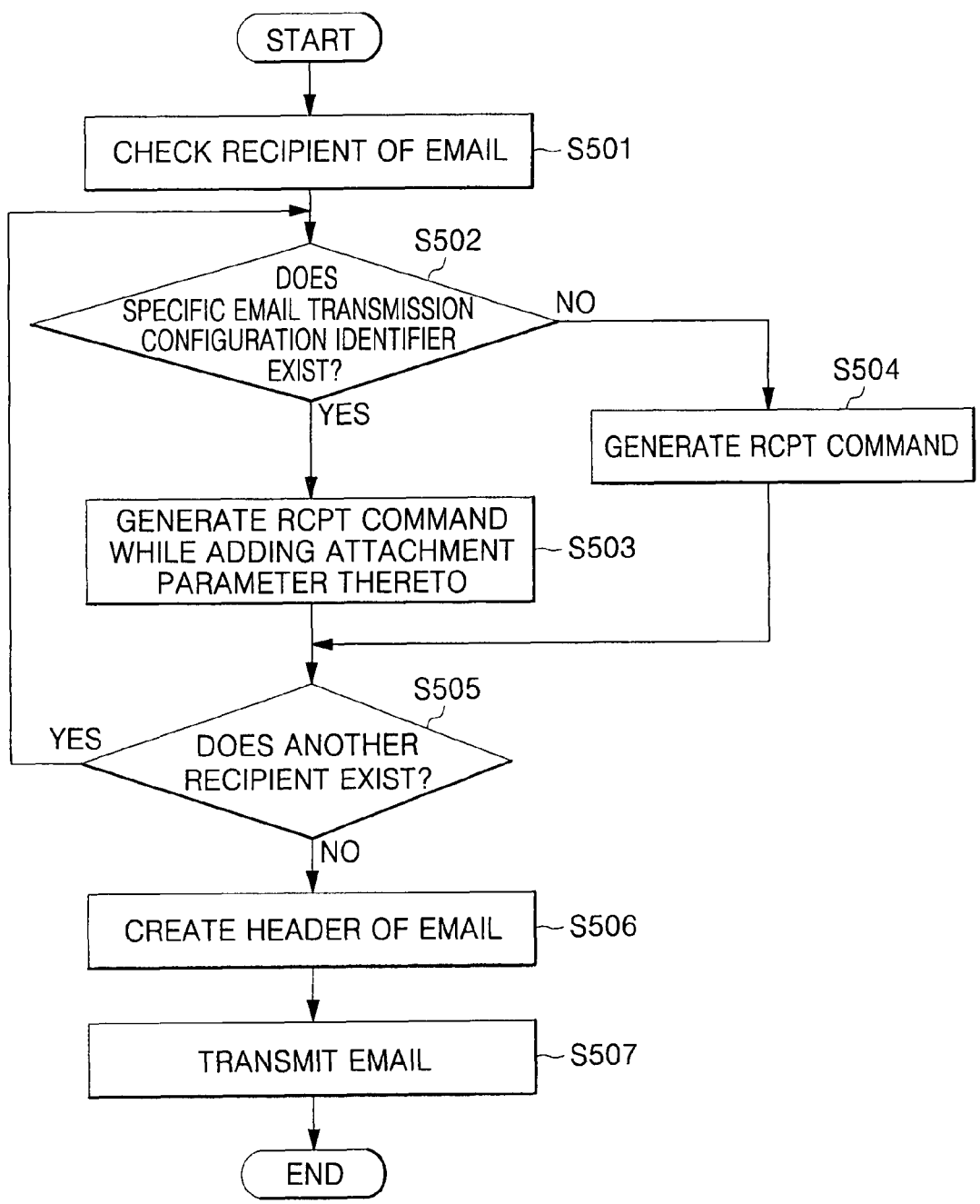
FIG. 5 is a flowchart showing a method of distinguishing an email recipient using a specific identifier according to an exemplary embodiment of the present invention.

FIG. 5 is a flowchart showing a method of distinguishing an email recipient using a specific identifier according to an exemplary embodiment of the present invention.

Referring to FIG. 5, the identifier recognizer 420 checks a recipient of email (S501). Subsequently, the identifier recognizer 420 determines whether the recipient has a specific email transmission configuration identifier (S502). When the recipient has a specific email transmission configuration identifier, it is considered that a sender has configured a mail text content alone without an attachment file to be sent to the recipient. In this case, the parameter generator 430 generates an RCPT command to be sent to the recipient while adding an ATTACHMENT parameter (S503).

On the other hand, when the recipient does not have a specific email transmission configuration identifier, the parameter generator 430 generates an RCPT command to be sent to the recipient without adding the ATTACHMENT parameter (S504).

The central processor 410 determines whether another recipient exists (S505). When there is another recipient, the procedure goes back to step 502. On the other hand, when there are no more recipients, the header creator 440 creates an email header with reference to information on the RCPT command (S506). The central processor 410 sends the email using the email header created by the header creator 440 (S507), thereby completing the whole procedure.

According to the terminal and method for distinguishing between email recipients using a specific identifier, when email is desired to be sent to several recipients, it is possible to set an individual transmission configuration for each recipient and transmit the email in different formats depending on the recipients. Thus, a large-sized file is prevented from being unnecessarily created or transferred, thereby reducing unnecessary traffic. In addition, it is possible to prevent the storage space of a mobile device from being wasted due to receiving an unwanted attachment file, thus enhancing user convenience.

While the present invention has been described with reference to exemplary embodiments thereof, it will be understood by those skilled in the art that various changes in from and detail may be made therein without departing from the scope of the present invention as defined by the following claims. Therefore, the specific email transmission configuration identifier defined in the present invention is not limited to having only the function of setting a user to whom email without an attachment file will be sent. Rather, the specific email transmission configuration identifier can further have another function of setting an individual email transmission configuration. In addition, the above description is made on the case where email is transmitted from a mobile device, but the present invention can be applied to a desktop also.

What is claimed is:

1. A method of distinguishing between a plurality of email recipients by using a specific email transmission configuration identifier, the method comprising:
  determining for each recipient, respectively, whether or not an individual email transmission configuration of each recipient has been set to include the specific email transmission configuration identifier;
  adding a parameter indicating the set transmission configuration to each respective recipient (RCPT) command and transmitting the RCPT command to each respective recipient for whom the specific email transmission configuration identifier is set, and transmitting an RCPT command without the parameter to each respective recipient for whom the specific email transmission configuration identifier is not set; and
  transmitting the email according to the transmission configuration set for each recipient when a response to the RCPT command is received;
  wherein determining whether or not the specific email transmission configuration identifier has been set for an individual email configuration for each respective recipient includes determining whether an individual email transmission configuration has been set for each respective recipient to determine whether the specific email transmission configuration identifier succeeds or precedes a particular recipient separator for each recipient; and
  wherein a setting of the individual email configuration for each respective recipient is independent of a setting of a particular individual email configuration for any other respective recipient; and
  wherein the specific email transmission configuration identifier comprises a single character and an absence or presence of the single character for each recipient determines whether an attachment file is transmitted to a recipient.

2. The method of claim 1, wherein the individual email transmission configuration indicates transmission of a mail text content alone without an attachment file.

3. The method of claim 2, wherein a value of the parameter is set to "NO" for a recipient receiving the mail text content alone without an attachment file.

4. The method of claim 2, wherein when transmitting email according to the transmission configuration set for each recipient, the mail text content alone without an attachment file is sent to the recipient of the RCPT command including a value of the parameter set to "NO", and an attachment file as well as the mail text content are sent to the recipient of the RCPT command not including the parameter.

5. The method of claim 1, wherein the specific email transmission configuration identifier is defined by a comma succeeding or preceding the particular recipient separator for the individual email transmission configuration for each recipient.

6. A portable terminal for distinguishing between email recipients using a specific email transmission configuration identifier, comprising:
  an identifier recognizer for recognizing the specific email transmission configuration identifier, checking whether an individual email transmission configuration has been set for each respective recipient to determine whether the specific email transmission configuration identifier succeeds or precedes a particular recipient separator for a particular individual email transmission configuration for each recipient, and sending information on the set transmission configuration to a parameter generator;
  the parameter generator for adding a parameter indicating the set transmission configuration to a recipient (RCPT) command to be sent to a recipient for whom the specific email transmission configuration identifier is set;
  a central processor for transmitting an email according to the transmission configuration set for each recipient when a response to the RCPT command is received; and
  a display for displaying a plurality of email recipients to receive email;
  wherein both the individual email transmission configuration for each recipient including the email transmission configuration identifier and the individual email transmission configuration for each particular recipient not including the specific email transmission configuration identifier are displayed without discrimination there between; and
  wherein a setting of the particular individual email configuration for each respective recipient is independent of a setting of a particular individual email configuration for any other respective recipient, and wherein
  the specific email transmission configuration identifier comprises a single character and an absence or presence of the single character for each recipient determines whether an attachment file is transmitted to a recipient.

7. The terminal of claim 6, wherein the individual email transmission configuration indicates transmission of a mail text content alone without an attachment file.

8. The terminal of claim 7, wherein the parameter generator adds the parameter indicating the individual transmission configuration to the RCPT command sent to the recipient receiving the mail text content alone without an attachment file, and sets a value of the parameter to "NO."

9. The terminal of claim 7, wherein the central processor sends the mail text content alone without an attachment file to the recipient of the RCPT command including a value of the parameter set to "NO," and sends an attachment file as well as the mail text content to a recipient of an RCPT command not including the parameter.

10. The terminal of claim 6, further comprising a header creator for creating an email header with reference to information on the RCPT command received from the parameter generator, and transmitting the created email header to the central processor.

11. The terminal of claim 6, wherein the specific identifier is defined by a comma.

12. A portable terminal for distinguishing between email recipients using a specific email transmission configuration identifier, comprising:

a memory:

a central processor coupled to the memory and configured to:

set an individual email transmission configuration of each recipient by detecting whether a specific email transmission configuration identifier succeeds or precedes a particular recipient separator for an individual email transmission configuration for each particular recipient; and transmit an email according to the individual transmission configuration set for each recipient when email is desired to be sent to the recipients, using the specific email transmission configuration identifier; and wherein a setting of the individual email configuration for each respective recipient is independent of a setting of a particular individual email configuration for any other respective recipient, and wherein the specific email transmission configuration identifier comprises a single character and an absence or presence of the single character for each recipient determines whether an attachment file is transmitted to a recipient.

13. The terminal of claim 12, wherein the individual email transmission configuration indicates transmission of a mail text content alone with or without an attachment file.

14. The terminal of claim 12, wherein a value of the parameter is set to "NO" for a recipient receiving the mail text content alone without an attachment file.

15. The terminal of claim 12, wherein the specific email transmission configuration identifier is defined by a comma.

16. The method of claim 1, wherein the specific email transmission configuration identifier comprises the single character succeeding or preceding the particular recipient separator.

17. The method of claim 1, wherein the setting of each of the particular individual email transmission configurations is displayed in a single display field that contains email addresses with the specific email transmission configuration identifier and email addresses without the specific email transmission configuration identifier that were grouped together with recipient separators there between.

18. The terminal of claim 12, wherein said portable terminal comprises a mobile communication terminal including a display, and wherein said display includes a common field for displaying the individual email transmission configuration for each recipient including the specific email transmission configuration identifier and the individual email transmission configuration for each recipient not including the specific identifier, without discrimination there between.

* * * * *